US012515599B2

(12) United States Patent
Klein et al.

(10) Patent No.: US 12,515,599 B2
(45) Date of Patent: Jan. 6, 2026

(54) METHOD FOR DETECTING DAMAGE TO AN OUTER SHELL OF A VEHICLE

(71) Applicant: Robert Bosch GmbH, Stuttgart (DE)

(72) Inventors: Martin Klein, Brackenheim (DE); Simon Koenig, Moeckmuehl (DE); Yannick Fischer, Ludwigsburg (DE); Klaus Heyer, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 72 days.

(21) Appl. No.: 18/681,854

(22) PCT Filed: Aug. 5, 2022

(86) PCT No.: PCT/EP2022/072084
§ 371 (c)(1),
(2) Date: Feb. 6, 2024

(87) PCT Pub. No.: WO2023/025568
PCT Pub. Date: Mar. 2, 2023

(65) Prior Publication Data
US 2024/0336212 A1  Oct. 10, 2024

(30) Foreign Application Priority Data

Aug. 24, 2021 (DE) ................... 10 2021 209 257.8

(51) Int. Cl.
*B60R 16/023* (2006.01)
*G06N 20/00* (2019.01)

(52) U.S. Cl.
CPC ......... *B60R 16/0234* (2013.01); *G06N 20/00* (2019.01); *B60Y 2400/304* (2013.01)

(58) Field of Classification Search
CPC ............ B60R 16/0234; B60R 16/0232; B60R 21/01332; B60R 21/01334;
(Continued)

(56) References Cited

U.S. PATENT DOCUMENTS 9,904,928 B1* 2/2018 Leise .................. G06Q 30/0185
2014/0379222 A1* 12/2014 Rittler ................. B60R 21/0132
701/45
(Continued)

FOREIGN PATENT DOCUMENTS

DE           4416813 A1   12/1994
DE        102012018521 A1   3/2013
(Continued)

OTHER PUBLICATIONS

International Search Report for PCT/EP2022/072084, Issued Nov. 30, 2022.

*Primary Examiner* — Adnan Aziz
(74) *Attorney, Agent, or Firm* — NORTON ROSE FULBRIGHT US LLP

(57) ABSTRACT

A method for detecting damage to an outer shell of a vehicle. The vehicle is of a specific type with specific vehicle data. Damage can be classified into at least two groups. Damage of a first group has a greater severity of the damage than damage of a second group. An acceleration of the vehicle is ascertained and/or a rotation rate of the vehicle is ascertained. Damage of the first group is ascertained if the acceleration of the vehicle exceeds a threshold value of the acceleration and/or if the rotation rate of the vehicle exceeds a threshold value of the rotation rate. The acceleration and/or the rotation rate are compared to acceleration values and/or rotation rate values learned for the specific vehicle type. Damage of the second group is ascertained if damage is detected as a function of the comparison to the learned values.

10 Claims, 3 Drawing Sheets

(58) Field of Classification Search
CPC ............ B60R 21/01336; B60R 21/013; B60Y 2400/304; G06N 20/00; G07C 5/085; G07C 5/0808; G01P 15/001; G01P 15/18; G01L 5/0052; G06Q 40/08

See application file for complete search history.

(56) References Cited

U.S. PATENT DOCUMENTS

| | | | |
|---|---|---|---|
| 2015/0307048 A1* | 10/2015 | Santora | B60R 21/013 348/148 |
| 2017/0050599 A1 | 2/2017 | Gilbert et al. | |
| 2017/0053461 A1* | 2/2017 | Pal | G08G 1/012 |
| 2021/0183180 A1* | 6/2021 | Geiger | G01L 5/0052 |
| 2023/0021809 A1* | 1/2023 | Tsuge | B60R 21/013 |

FOREIGN PATENT DOCUMENTS

| | | |
|---|---|---|
| DE | 102014002992 A1 | 8/2014 |
| DE | 102015203673 A1 | 9/2016 |
| DE | 102016006037 A1 | 11/2016 |
| DE | 102017208403 A1 | 11/2018 |
| DE | 102017221891 A1 | 6/2019 |
| DE | 102019105535 A1 | 9/2020 |
| DE | 102019130486 A1 | 5/2021 |
| DE | 102019218951 A1 | 6/2021 |
| GB | 2527781 A | 1/2016 |
| JP | 2003226230 A | 8/2003 |
| JP | 2016163340 A | 9/2016 |
| JP | 2021033439 A | 3/2021 |
| WO | 2017135825 A1 | 8/2017 |

\* cited by examiner

METHOD FOR DETECTING DAMAGE TO AN OUTER SHELL OF A VEHICLE

BACKGROUND INFORMATION

A method for damage detection in a control device is described in German Patent Application No. DE 10 2012 018 521 A1.

SUMMARY

According to the present invention, a method for detecting damage to an outer shell of a vehicle is provided, wherein the vehicle is designed as a vehicle of a specific type with specific vehicle data. According to an example embodiment of the present invention, damage is classified into at least two groups, wherein damage of a first group has a greater severity of the damage than damage of a second group. Furthermore, an acceleration of the vehicle is ascertained by means of an acceleration sensor and/or a rotation rate of the vehicle is ascertained by means of a rotation rate sensor. Damage of the first group is ascertained if the acceleration of the vehicle exceeds a threshold value of the acceleration and/or if the rotation rate of the vehicle exceeds a threshold value of the rotation rate. Furthermore, the acceleration and/or the rotation rate are compared to acceleration values and/or rotation rate values learned for the specific vehicle type, wherein damage of the second group is ascertained if damage is detected as a function of the comparison to the learned values.

An advantage of the present invention is that both major damages and minor damages can be detected by means of the provided method of the present invention. Minor damages can in particular be reliably detected by reference to various specifications of the vehicle and the comparison to learned values. As a result, when using the vehicle as a shared vehicle, in which several different drivers are traveling with the vehicle, it can be detected when the current driver is causing damage to the vehicle. This in particular makes it possible to ascertain whether immediate or rapid repair of the damage is necessary. By ascertaining the acceleration and/or the rotation rate at the current time, it can in particular be ascertained in real time, by comparing the current acceleration values or rotation rate values to threshold values, whether damage to the vehicle was caused and thus in particular whether an accident was caused.

This in particular makes it possible to directly assign any resulting damage to a driver who is currently driving the vehicle. This is in particular advantageous in the application of the method in vehicles that can be rented by various people, e.g., vehicles of mobility service providers. For example, a driver can be prosecuted for the violation or for the resulting damage. Furthermore, damages to vehicles can be detected and thus remedied, as a result of which the vehicles can in particular be kept in a safe state or a comfortable state, in particular also in the case of frequent changes of the drivers.

An advantage of the present invention is furthermore that the detection of the damages not only is based on threshold values but also includes the vehicle specifics and that the data are checked against damage data, in particular already learned or historical damage data. As a result, the damage detection is precise in the classification and in particular in the determination of the point of damage. By promptly notifying the vehicle keeper, damage can be remedied more quickly, as a result of which the vehicle is always kept in a good state. If the vehicle is a fleet vehicle, wherein a fleet vehicle in particular has one keeper and several users, it can also be determined promptly and objectively who has caused the damage.

The vehicle can be designed as a passenger car. Damage can be formed as damage to the outer shell of the vehicle. Damage can, for example, occur during an accident, for example when a vehicle collides with another object. Damage to an outer shell of a vehicle can in particular include dents, scratches in the paint, or other damage to the vehicle. Damage of the first group can, for example, include damage to the rear end or front area resulting from a collision, or also a broken-off side mirror.

Damage of the second group can, for example, include a scratch in the paint or can include a smaller dent in the metal. Damage can occur while driving, e.g., when a vehicle crashes into another vehicle, while parking, e.g., when the bumper bar scrapes the curb, or when parked, e.g., damage from the impact of a shopping cart. Depending on speed and vehicle condition, the damage can be a scratch, a dent, or severe damage. In particular, underbody damages that occur while driving, for example over a speed bump, can be ascertained.

In an exemplary embodiment of the present invention, the values learned for the specific vehicle type are learned by means of machine learning of already detected damages of the specific vehicle type. For example, the values for several different vehicle types are learned. This in particular makes it possible to safely and/or reliably perceive damages. This advantageously makes it possible to detect even minor damage that, for example, does not exceed a minimum threshold, in particular a threshold of the acceleration or rotation rate. Training can, for example, reduce the likelihood of damage reports of incorrectly detected damages.

In a development of the present invention, damage of a first group in particular requires repair of the damage. The damage of the first group in particular has a higher severity, in particular a higher damage severity, in particular with respect to damage of the second group. It can thereby be ascertained whether or not the vehicle can continue to be used. It can thus be reliably determined whether the vehicle must be repaired immediately. This can in particular increase the safety in traffic since vehicles with severe damages can be prevented from still being used in traffic.

Advantageously, according to an example embodiment of the present invention, the first threshold value of the acceleration can be a value of approximately 2 g to 3 g, in particular 2.3 g to 2.5 g, in particular 2.3 g. This in particular makes it possible to safely and reliably detect damages of the first group. Severe damages, which in particular require repair, can, for example, lead to an impairment of the safety in traffic.

Thus, safe detection of severe damages of the first group can increase the safety in traffic.

Furthermore, the specific vehicle data can, in particular, be data of a vehicle geometry and/or an axle spacing and/or a model and/or a body type and/or a weight of the vehicle. The different vehicle geometry or axle spacings of the different vehicle types result in characterizing acceleration values or rotation rate values that indicate particular damages from accidents. Thus, damages, in particular also minor damages, in particular cosmetic damages, can be safely and/or reliably detected by the inclusion of the specific vehicle data. By referencing the vehicle specifics, such as the vehicle geometry, axle spacing, model, body type, and/or weight, the method is advantageously more accurate than other methods without reference to the vehicle specifics.

In an advantageous embodiment of the present invention, the acceleration and/or the rotation rate are compared to acceleration values and/or rotation rate values learned for the specific vehicle type, if the acceleration of the vehicle exceeds a second threshold value of the acceleration and falls below a first threshold value of the acceleration and/or if the rotation rate of the vehicle exceeds a second threshold value of the rotation rate and falls below a first threshold value of the rotation rate. This in particular makes it possible to also detect minor damages, which are in particular caused by minor accidents or accidents that are not so severe.

Advantageously, according to an example embodiment of the present invention, a position of the damage to the vehicle can be detected as a function of the comparison to the learned values. This in particular makes it possible to safely and/or reliably detect a position of the damage to the vehicle. The position can in particular be documented. This can simplify repair of the vehicle. In a development, the outer shell of the vehicle can be divided into at least nine different zones, wherein a position of the damage to the vehicle in one or more of the nine areas is detected as a function of the comparison to the learned values. This can in particular simplify the further procedure, e.g., the repair of the vehicle, in that it is in particular possible to specify the position where the vehicle should or needs to be repaired.

In an exemplary embodiment of the present invention, when damage to an outer shell of the vehicle is detected, a report is in particular output. Damage can thereby be reported to a server, for example. Furthermore, the damage can in particular be stored by means of the report. Additional actions can in particular be triggered by reporting the damage. For example, when severe damage is detected, repair may be necessary, wherein this can be reported to a server, for example. In a development, the repair can be triggered or requested by means of the report.

Furthermore provided according to the present invention is a device for detecting damage to an outer shell of a vehicle, wherein the device is designed to carry out a method for detecting damage to an outer shell of a vehicle, according to the present invention.

In a development of the present invention, the device can comprise an acceleration sensor for ascertaining an acceleration of the vehicle and/or a rotation rate sensor for ascertaining a rotation rate of the vehicle. This in particular makes it possible to ascertain the current acceleration of the vehicle or the current rotation rate of the vehicle. By comparing the current acceleration values or rotation rate values with threshold values, it can in particular be ascertained in real time whether damage to the vehicle has been caused.

BRIEF DESCRIPTION OF THE DRAWINGS

Exemplary embodiments of the present invention are shown in the figures and explained in more detail in the following description. The same reference signs are used for elements that are shown in the various figures and have a similar effect, wherein a repeated description of the elements is dispensed with.

DETAILED DESCRIPTION OF EXAMPLE EMBODIMENTS

Figure 1:
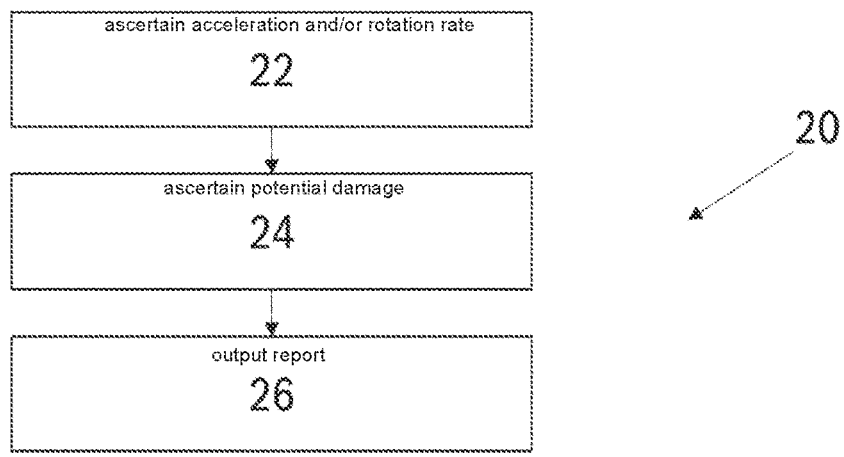
FIG. 1 shows a schematic representation of a method for detecting damage according to an exemplary embodiment of the present invention.

FIG. 1 shows a schematic representation of a method 20 for detecting damage according to an exemplary embodiment of the present invention. The method 20 is designed to detect damage to an outer shell of a vehicle. The method 20 can in particular be performed on a device according to the device according to FIG. 4 and/or according to FIG. 5.

Preferably, the method 20 is in particular based on the driving dynamics data, e.g., an acceleration and/or a rotation rate captured by the device.

In this embodiment, the vehicle is designed as a vehicle of a specific type with specific vehicle data. In an exemplary embodiment, the specific data can be vehicle data of a vehicle geometry, model, body type, weight, and/or axle spacing of the vehicle. In other words, the vehicle whose potential damage is to be detected is a vehicle of a particular vehicle type with specific data. The method can in particular be carried out or optimized for various vehicle types. For this purpose, the data or the vehicle data of various vehicle types can be learned. In other words, the method can be specifically designed for various vehicle types. Preferably, the method is capable of distinguishing which vehicle it is in order to optimize the damage detection for a specific vehicle type.

In a first step 22 of the method 20, an acceleration of the vehicle is ascertained by means of an acceleration sensor and/or a rotation rate of the vehicle is ascertained by means of a rotation rate sensor. Preferably, the acceleration of the vehicle is measured by means of an acceleration sensor and/or the rotation rate of the vehicle is measured by means of a rotation rate sensor. In a development, further influencing variables, such as the steering angle, can be measured. In other words, the sensors can be used to ascertain whether there was an unusual acceleration or deceleration on the vehicle and/or whether the rotation rate of the vehicle has changed in comparison to the driving direction. This makes it possible to ascertain whether damage to the vehicle has occurred.

In a second step 24 of the method 20, a potential damage is ascertained. Damage can be classified into at least two groups, wherein damage of a first group has a greater severity of the damage than damage of a second group. In an advantageous embodiment, damage of a first group requires repair of the damage. For example, a group can also be referred to as a damage class. Damages that have a certain severity and, in particular, entail repair can, for example, be classified in a first group.

At a minimum, the vehicle for which damage of the first group was detected should in particular not continue to be driven without an inspection. Damages that have a lesser severity than the damages of the first group can, in particular, be classified in the second group. For example, significant damages or cosmetic damages can be included in the second group. In particular, the second group can furthermore be divided into a first subgroup with significant damages, which should be repaired in a timely manner but allow continued driving of the vehicle, and into a second subgroup with cosmetic damages, e.g., minor scratches, which do not need to be repaired immediately.

In other words, damage can be formed as damage to the outer shell of the vehicle. In other words, the data captured are examined and classified by means of algorithms.

Preferably, according to an example embodiment of the present invention, damage can be classified into three classes, a first class of more severe damages, a second class of significant damages, and a third class of cosmetic damages, e.g., scratches or dents. In other words, a distinction between the following classes is made: cosmetic damage (scratches, dents), significant and severe damage.

In order to ascertain the damage, according to an example embodiment of the present invention, the current acceleration values and/or rotation rate values are in particular compared to stored threshold values. Damage of the first group is ascertained if the acceleration of the vehicle exceeds a threshold value of the acceleration and/or if the rotation rate of the vehicle exceeds a threshold value of the rotation rate.

Advantageously, in a development of the present invention, the threshold value of the acceleration can be a value that results in clearly visible damage to the outer shell of the vehicle.

Advantageously, in a development, the threshold value of the acceleration can be a value of approximately 2 g to 3 g, in particular 2.3 g to 2.5 g, in particular 2.3 g. Preferably, the threshold value of the acceleration is a value that does not arise from a raw signal but rather from a low-pass-filtered signal, e.g., a moving average over 60 ms. Furthermore, the various signal portions can be weighted in the X direction, Y direction, and Z direction. This means that an amplitude of greater than 2.3 g or 2.5 g, for example 7 g, can be formed in the signal, but this does not have to result in the threshold value of the acceleration as a value of approximately 2 g to 3 g, in particular 2.3 g to 2.5 g, in particular 2.3 g, being reached.

Furthermore, according to an example embodiment of the present invention, the acceleration and/or the rotation rate are compared to acceleration values and/or rotation rate values learned for the specific vehicle type. Damage of the second group is ascertained if damage is detected as a function of the comparison to the learned values. In other words, the detection of damages to the vehicle is based on two ways: on the one hand through the exceedance of threshold values of the acceleration or deceleration on the vehicle and/or the rotation rate and the other hand through the comparison to learned values. In a development, damage of the first group can be ascertained if damage of the first group is detected as a function of the comparison to the learned values.

Advantageously, according to an example embodiment of the present invention, the values learned for the specific vehicle type are learned by means of machine learning of already detected damages of the specific vehicle type. In other words, values that are carried out by means of test series of a specific vehicle type are learned. For this purpose, test series can be carried out with different vehicle types so that the method for detecting damage can be carried out for several different vehicle types. In order to improve the learned values, the algorithm, in particular for damage detection, is in particular tailored to the particular vehicle or to the particular vehicle type. In other words, the method takes into account what vehicle type it is. The term "vehicle type" can, for example, be understood to mean the brand and/or the size and/or the type of the vehicle. Furthermore, specific vehicle data are taken into account, such as the length, width, axle spacing, weight, and others.

In other words, the algorithm is trained to reliably detect the damages. For this purpose, various vehicle types, in particular different models, were equipped with the device and real-world field tests were carried out. Preferably, the collected data were compiled as a damage database on the one hand, and the algorithms were progressively refined on the other hand. This type of improvement can preferably be continued continuously so that the database becomes more and more extensive and the detection becomes more and more accurate.

In an advantageous embodiment of the present invention, the acceleration and/or the rotation rate can be compared to acceleration values and/or rotation rate values learned for the specific vehicle type, if the acceleration of the vehicle exceeds a second threshold value of the acceleration and falls below a first threshold value of the acceleration and/or if the rotation rate of the vehicle exceeds a second threshold value of the rotation rate and falls below a first threshold value of the rotation rate.

According to an example embodiment of the present invention, the second step 24 of the method 20 can be carried out in a cloud.

For this purpose, the captured data, the acceleration or rotation rate, are transmitted to a cloud. In the cloud, further influencing factors, e.g., a speed of the vehicle, can be included in a development in order to classify the damage and in particular ascertain a location of the damage.

In an alternative embodiment of the present invention, the second step 24 of the method 20 can also be performed on the device.

In a third step 26 of the method 20 according to an example embodiment of the present invention, a report can be output in a development when damage to an outer shell of the vehicle is detected. For example, when damage is detected, the measured acceleration values and/or rotation rate values or further values, such as the time at which the damage was detected, can be output as a report. In a development, GPS data and thus the position of the vehicle and/or a diagram, in which the acceleration or the rotation rate is shown over time, and/or a probability, by means of which the damage is determined, and/or a road view of the surroundings of the vehicle can furthermore be transmitted by means of the report. The report can in particular be sent to a server. In a development, the report can be stored. The report can, for example, be stored locally or stored on the server. In an advantageous embodiment, a mobility service provider can be informed of the damage by the report.

In other words, in the third step 26 of the method 20, the damage is reported to the vehicle keeper. For this purpose, the captured data can in particular be enriched with further information so that not only the damage class and the location of the damage are reported but also the date and time of the damage, for example. The damage is reported via a push interface between a cloud and the vehicle keeper, in particular a cloud of the vehicle owner, or via email. In a development, in addition to the transmitted data, the vehicle keeper can view additional information about the damage in a customer dashboard. This can, for example, include GPS coordinates of a location where the damage has occurred, or a street view. Furthermore, the dashboard can store what speed the vehicle had and the diagram with the acceleration values on all three axes can be added. The vehicle keeper can thereby understand how, when, and where the damage has occurred.

In other words, the ascertained damage can promptly be reported to the vehicle keeper so that the latter can take action. For this purpose, a damage event can in particular be pushed via a cloud into the backend of the vehicle keeper or an email notification can be triggered. Based on the data, the vehicle keeper can then decide whether to have the vehicle repaired.

In a development of the present invention, the method can be started again. If no damage is determined for an extended period of time, the method and thus the device on which the method is performed can be put into a standby mode. The device can thus be operated in a low-power mode. This can save energy. In other words, the device can be connected to the voltage supply of the battery of the vehicle. In an exemplary embodiment, in order not to load the battery, the device can have three operating states: the active mode while driving, the low-power mode when the vehicle does not move for more than 15 min, and the ultra-low power mode when the vehicle does not move for more than 14 days.

Advantageously, according to an example embodiment of the present invention, the method can be carried out while the vehicle is being driven or when the vehicle is parked. In other words, the damage detection can function while driving as well as when parked, and thus in particular independently of the operating mode. In a development, the method can be started if a particular acceleration threshold value or rotation rate threshold value is exceeded.

In other words, for ascertaining damage, the driving dynamics data of the vehicle are captured, in particular an acceleration and/or a rotation rate. For this purpose, according to an example embodiment of the present invention, a device, in particular designed as a sensor box, is arranged in the vehicle. The device can use an algorithm to examine the driving dynamics of the vehicle and, when threshold values are exceeded, send sensor data to a cloud. In the cloud, the data are again examined and classified by algorithms. If there is severe damage, the damage is reported to the vehicle owner, in particular to a mobility service provider. If there is significant or cosmetic damage, the captured data are compared to damage data from a database of learned data in order to be able to determine what type of damage it is, in particular cosmetic damage or significant damage. In addition to the classification of the damage, it can be ascertained in a development where the damage to the outer shell of the vehicle has occurred.

Preferably, according to an example embodiment of the present invention, the installation-location-dependent sensor coordinate system of the device can be transformed into the central vehicle coordinate system. By means of the vehicle-specific installation information of the device, the acceleration values can be corrected, in particular by rotation through the windshield and shifting relative to the vehicle center of gravity, in combination with the rotation rates such as if they were measured centrally in the vehicle. This can reduce or prevent incorrect triggering of the system. In other words, the sensor data measured at the inclined windshield can be transformed to a coordinate system in the center of gravity of the vehicle with the longitudinal/lateral/vertical axes common there. Preferably, filtered acceleration values are continuously compared against an input threshold. This can in particular be designed as a trigger.

For classifying the damage, according to an example embodiment of the present invention, it is in particular possible to calculate values describing the signal characteristic of the accelerations and rotation rates. These values can preferably be in partly vehicle-class-specific ranges so that the damage is assigned to a particular class. Furthermore, a steering angle and the resulting area on the vehicle can in particular be ascertained. For severe damages, acceleration values pre-processed by means of the rotation rates can be compared against a threshold.

Furthermore, according to an example embodiment of the present invention, a correction model can be designed to take into account the damage sensitivity of different vehicle areas.

Preferably, soft parts of the vehicle can have greater damage with the same impact than rigid areas of the vehicle, which have less damage with the same impact than soft areas. For example, soft corners can have greater damage with the same impact than a rigid bumper bar, which has less damage with the same impact than soft corners.

Figure 2:
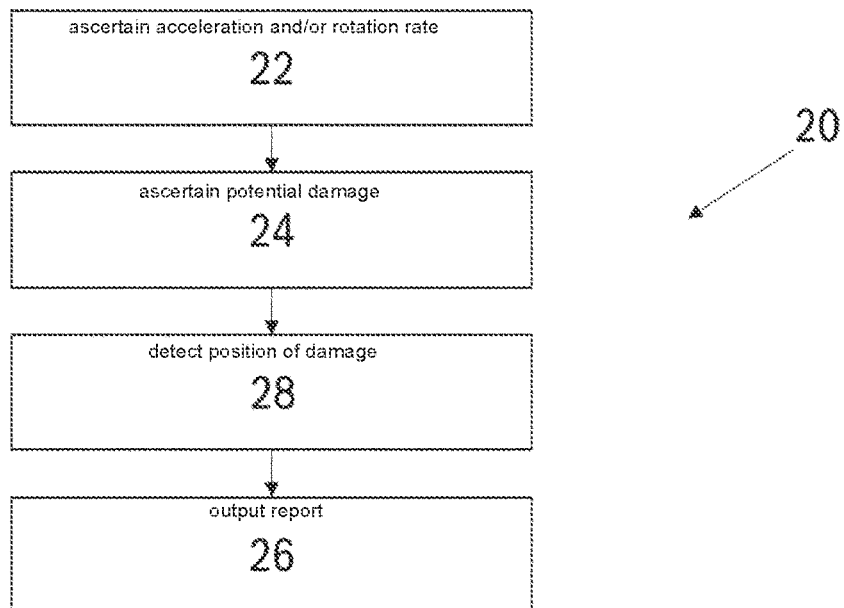
FIG. 2 shows a schematic representation of a method for detecting damage according to an exemplary embodiment of the present invention.

FIG. 2 shows a schematic representation of a method 20 for detecting damage according to an exemplary embodiment of the present invention. The method 20 is designed to detect damage to an outer shell of a vehicle. The method 20 can in particular be performed on a device according to the device according to FIG. 4 and/or according to FIG. 5. The method 20 can comprise the steps of the method 20 according to FIG. 1, thus a first step 22, a second step 24, and a third step 26.

Furthermore, the method 20 according to FIG. 2 comprises a fourth step 28, wherein the fourth step 28 can be performed in parallel to the second step 24 or together with the second step 24. In the fourth step 28 of the method 20, a position of the damage to the vehicle is detected as a function of the comparison to the learned values. In other words, a position of the damage to an outer shell of the vehicle can be detected by means of the learned values and by means of the acceleration values and/or the rotation rate values. For this purpose, the outer shell of the vehicle in an advantageous design, for example according to the embodiment according to FIG. 5, can be divided into at least nine different zones, and wherein a position of the damage in one or more of the nine areas on the vehicle is detected as a function of the comparison to the learned values. In other words, in addition to the damage class or the severity of the damage, the location of the damage is detected. In other words, the method can be used to detect the location or the position on the vehicle where the damage has occurred. Preferably, by comparing the current acceleration values and/or rotation rate values to stored threshold values, the location or the position of the detected damage can be ascertained.

Preferably, the position or the location where the damage was detected can be output by means of the report according to the third step 26, stored, and/or transmitted to a server.

Figure 3:
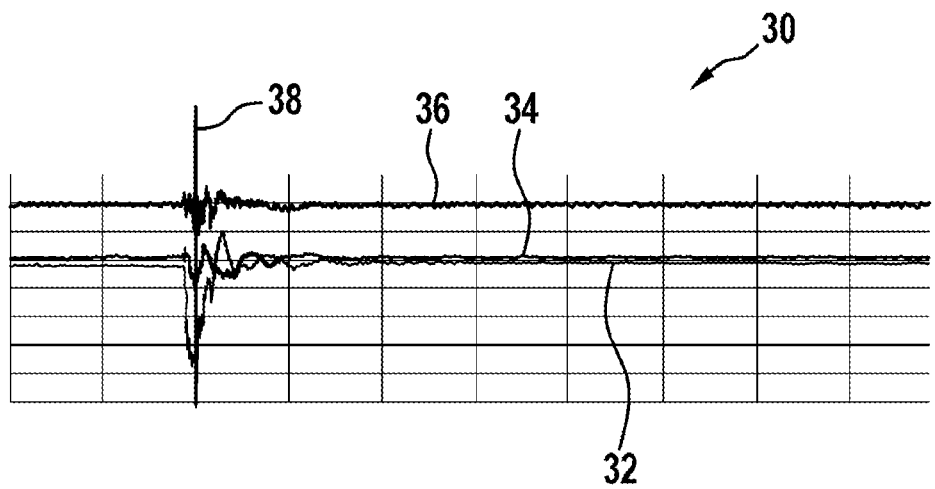
FIG. 3 shows a schematic representation of a diagram according to an exemplary embodiment of the present invention.

FIG. 3 shows a schematic representation of a diagram 30 according to an exemplary embodiment of the present invention. A function of the acceleration of the vehicle over time is shown in the diagram 30. In particular, a function 32 of the acceleration of the vehicle in the X direction of the vehicle, i.e., in the driving direction, is shown. Furthermore, a function 34 of the acceleration of the vehicle in the Y direction of the vehicle, i.e., perpendicular to the driving direction, in particular to the right and left with respect to the driving direction, is shown. Furthermore, a function 36 of the acceleration of the vehicle in the Z direction of the vehicle, i.e., in particular upward or downward with respect to the driving direction, is shown.

At time 38, an increased fluctuation of the three functions 32, 34, 36 can in particular be seen. As a result, by comparing the fluctuation of the functions to threshold values and/or comparing the fluctuation by means of learned values, damage can be detected and in particular classified into various groups or damage classes.

Figure 4:
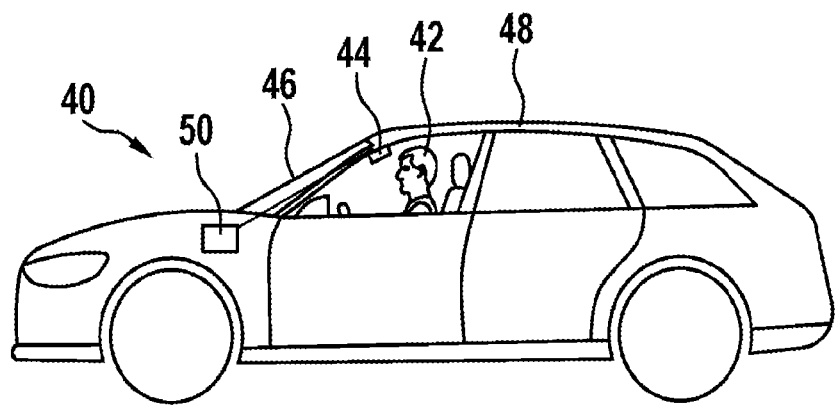
FIG. 4 shows a schematic representation of a vehicle with a device according to an exemplary embodiment of the present invention.

FIG. 4 shows a schematic representation of a vehicle 40, e.g., a motor vehicle, e.g., a passenger car, with a vehicle occupant 42. The vehicle 40 comprises a device 44 for detecting damage to an outer shell of a vehicle 40. A method according to the method according to FIG. 1 and/or according to FIG. 2 can in particular be performed on the device 44. The outer shell of the vehicle 40 can, for example, be referred to as the exterior of the vehicle 40.

For this purpose, the device 44 can in particular comprise an acceleration sensor for ascertaining an acceleration of the vehicle and/or a rotation rate sensor for ascertaining a rotation rate of the vehicle. Alternatively or additionally, the acceleration sensor and/or the rotation rate sensor can be arranged in the vehicle, wherein the data ascertained by means of the sensors in the vehicle are transmitted to the device 44 or received by the device 44.

The device 44 can, for example, be arranged on the windshield 46 of the vehicle 40. Alternatively or additionally, the device or a further device can be arranged on the vehicle roof 48. In a development, the device 44 can be arranged in a firmly bonded manner on the windshield 46, for example by means of an adhesive, e.g., by means of an adhesive pad, in particular a double-sided adhesive tape or adhesive pad. Alternatively, the device 44 can be arranged in a positive and/or non-positive manner on a vehicle roof 48. In an alternative embodiment, the device 44 can be arranged on the dashboard or on the instrument cluster of the vehicle 40. In a development, the device 44 can be arranged on a pillar of the vehicle 40 or in the center of the vehicle 40, e.g., in an arm rest.

Preferably, for the voltage supply, the device 44 can be connected to a battery 50 of the vehicle 40. In other words, the device 44 can, for example, be connected to the vehicle battery 50, in particular for operating the device 44.

In a development, the device 44 comprises a mobile transmission unit designed to send data externally or to outside of the vehicle, e.g., to an external service provider and/or to a server and/or to a cloud.

In other words, the device 44 can be designed as a sensor box. The sensor box is designed as hardware, which can, for example, be attached to the windshield of the vehicle. The sensor box comprises one or more acceleration sensors and/or one or more rotation rate sensors. Furthermore, the device 44 can also comprise a modem and/or a SIM card. As a result, the box can send the gathered data to a cloud autonomously.

Preferably, the device is connected to the voltage supply 50 of the vehicle 40. In other words, the device is supplied with voltage by the vehicle, e.g., by a battery of the vehicle.

Figure 5:
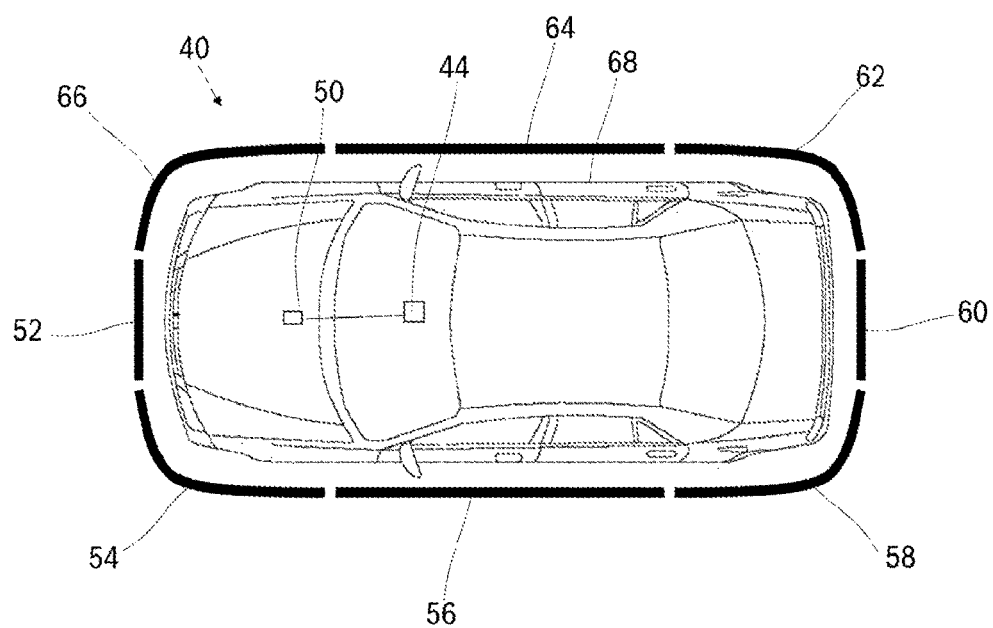
FIG. 5 shows a schematic representation of a vehicle with a device according to an exemplary embodiment of the present invention.

FIG. 5 shows a schematic representation of a plan view of a vehicle 40, e.g., a motor vehicle, e.g., a passenger car, with a device 44 for detecting damage to an outer shell of the vehicle 40. The vehicle 40 according to FIG. 4 can be designed according to the vehicle 40 according to FIG. 5. The device 44 can in particular be designed according to the device 44 according to FIG. 5. A method according to the method according to FIG. 1 and/or FIG. 2 can in particular be performed on the device 44.

In this advantageous embodiment, the vehicle 40 or the outer shell of the vehicle 40 is divided into nine areas. Preferably, the vehicle 40 can have a first area 52 arranged at the front in the front area of the vehicle. Furthermore, the vehicle 40 can have a second area 54 arranged at the front in the left front area of the vehicle 40 and in the transition to the side. In the left side area, the vehicle 40 can have a third area 56. In the left rear area of the rear end, the vehicle 40 can have a fourth area 58 extending from the side area into the rear area of the rear end. Preferably, the vehicle has a fifth area 60 in the area of the rear end. In the right rear area of the rear end, the vehicle 40 can have a sixth area 62. In the right side area, the vehicle 40 can have a seventh area 64. In the right front area of the front area of the vehicle 40, the vehicle 40 can have an eighth area 66. Furthermore, the vehicle 40 has a ninth area 68, which is thus arranged underneath the vehicle in the lower area.

Preferably, any damage detected can be detected or localized in any of the areas 52 to 68. In other words, damage can be assigned to one of the areas 52 to 68. As a result, damage can be found more easily, in particular during an inspection. For example, this can also make it possible to store the damage and to store the position of the damage.

The invention claimed is:

1. A method for detecting damage to an outer shell of a vehicle, wherein the vehicle is of a specific type with specific vehicle data, the method comprising the following steps:
    classifying damage to the outer shell of the vehicle into at least two groups, wherein damage of a first group of the groups has a greater severity of damage than damage of a second group of the groups;
    ascertaining: (i) an acceleration of the vehicle using an acceleration sensor and/or (ii) a rotation rate of the vehicle using a rotation rate sensor; wherein damage of the first group is ascertained when the acceleration of the vehicle exceeds a threshold value of the acceleration and/or when the rotation rate of the vehicle exceeds a threshold value of the rotation rate, and
    comparing the acceleration and/or the rotation rate to acceleration values learned for a specific vehicle type of the vehicle and/or rotation rate values learned for the specific vehicle type, wherein damage of the second group is ascertained when damage is detected as a function of the comparison to the learned values,
    wherein the outer shell of the vehicle is divided into at least nine different zones, and wherein a position of the damage to the vehicle in one or more of the nine areas is detected as a function of the comparison to the acceleration values learned for a specific vehicle type of the vehicle and/or the rotation rate values learned for the specific vehicle type.

2. The method according to claim 1, wherein the acceleration values learned for the specific vehicle type and/or the rotation rate values learned for the specific vehicle type are learned using machine learning of already detected damages of the specific vehicle type.

3. The method according to claim 1, wherein damage of a first group requires repair of the damage.

4. The method according to claim 1, wherein the first threshold value of the acceleration is a value of 2 g to 3 g.

5. The method according to claim 1, wherein the specific vehicle data are data of a vehicle geometry and/or an axle spacing and/or a model and/or a body type and/or a weight of the vehicle.

6. The method according to claim 1, wherein the acceleration and/or the rotation rate are compared to the acceleration values learned for the specific vehicle type and/or the rotation rate values learned for the specific vehicle type, (i) when the acceleration of the vehicle exceeds a second threshold value of the acceleration and falls below a first threshold value of the acceleration and/or (ii) when the rotation rate of the vehicle exceeds a second threshold value of the rotation rate and falls below a first threshold value of the rotation rate.

7. The method according to claim 1, wherein a position of the damage to the vehicle is detected as a function of the comparison to the acceleration values learned for a specific vehicle type of the vehicle and/or the rotation rate values learned for the specific vehicle type.

8. The method according to claim 1, wherein a report is output when damage to the outer shell of the vehicle is detected.

9. A device configured to detect damage to an outer shell of a vehicle, wherein the vehicle is of a specific type with specific vehicle data, the device being configured to:
 classify damage to the outer shell of the vehicle into at least two groups, wherein damage of a first group of the groups has a greater severity of damage than damage of a second group of the groups;
 ascertain: (i) an acceleration of the vehicle using an acceleration sensor and/or (ii) a rotation rate of the vehicle using a rotation rate sensor; wherein damage of the first group is ascertained when the acceleration of the vehicle exceeds a threshold value of the acceleration and/or when the rotation rate of the vehicle exceeds a threshold value of the rotation rate, and
 compare the acceleration and/or the rotation rate to acceleration values learned for a specific vehicle type of the vehicle and/or rotation rate values learned for the specific vehicle type, wherein damage of the second group is ascertained when damage is detected as a function of the comparison to the learned values,
 wherein the outer shell of the vehicle is divided into at least nine different zones, and wherein a position of the damage to the vehicle in one or more of the nine areas is detected as a function of the comparison to the acceleration values learned for a specific vehicle type of the vehicle and/or the rotation rate values learned for the specific vehicle type.

10. The device according to claim 9, wherein the device includes: (i) the acceleration sensor configured to ascertain the acceleration of the vehicle, and/or (ii) the rotation rate sensor configured to ascertain the rotation rate of the vehicle.

* * * * *